(No Model.)
A. H. FANCHER.
MANUFACTURE OF SHEET METAL WARE.
No. 245,470. Patented Aug. 9, 1881.
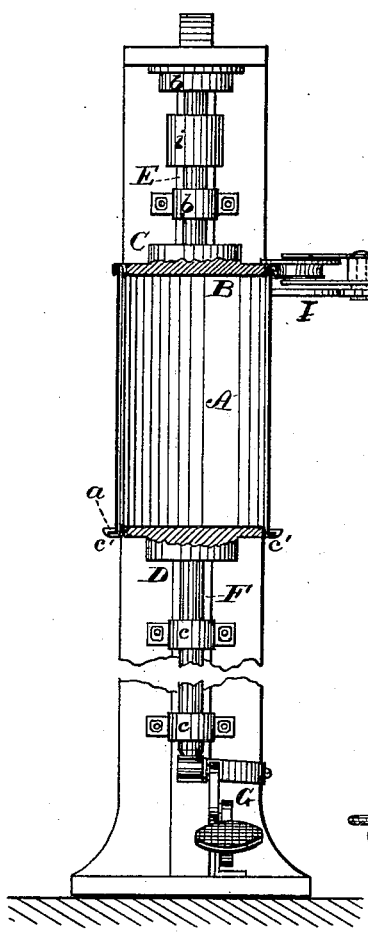
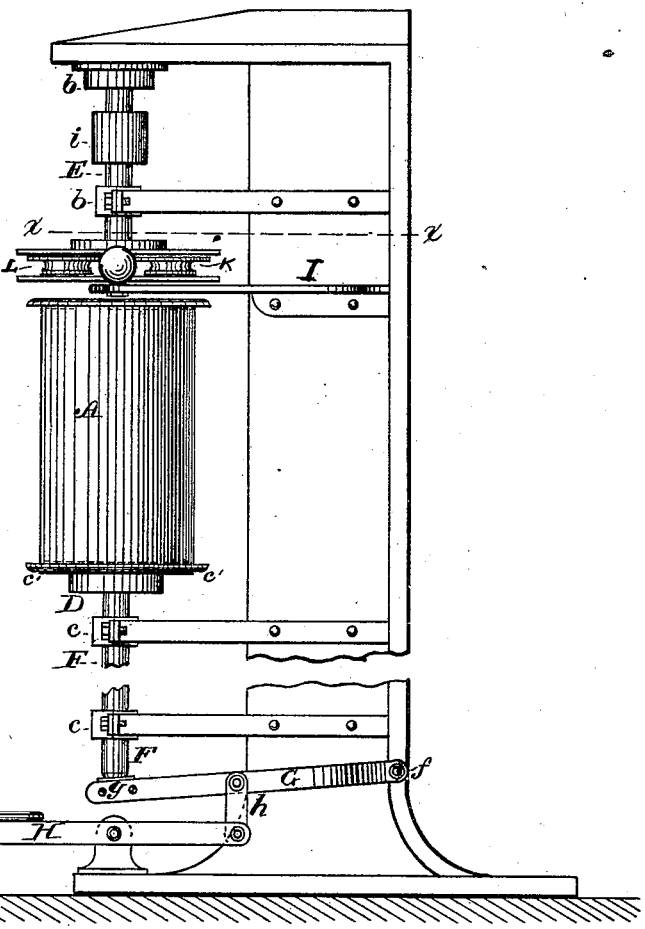
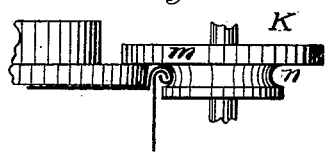
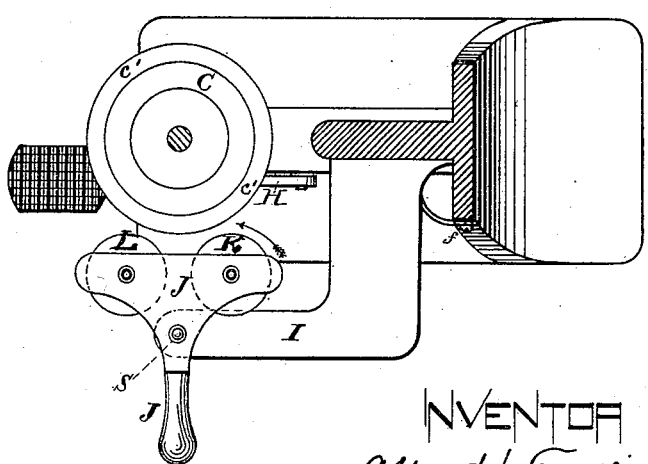
WITNESSES
Robert W. Matthews
Thomas E. Crossman
INVENTOR
Alton H. Fancher
per James A. Whitney
Atty
N. PETERS, Photo-Lithographer, Washington, D. C.

UNITED STATES PATENT OFFICE.

ALTON H. FANCHER, OF BROOKLYN, NEW YORK.

MANUFACTURE OF SHEET-METAL WARE.

SPECIFICATION forming part of Letters Patent No. 245,470, dated August 9, 1881.

Application filed May 6, 1881. (No model.)

*To all whom it may concern:*

Be it known that I, ALTON H. FANCHER, of Brooklyn, in the county of Kings and State of New York, have invented certain Improvements in the Manufacture of Sheet-Metal Ware, of which the following is a specification.

This invention comprises certain novel combinations of parts whereby is produced an efficient machine for uniting the heads to the bodies of sheet-metal cans with a double seam, the joint being of such a character that but little strain is brought upon the metal at the lines of bending, so that in the production of the cans or boxes sheet metal of an inferior character as compared with that ordinarily required may be used.

Figure 1 is a vertical sectional view of an apparatus embraced in my said invention; and Fig. 2 is a side elevation, in a plane at right angles to that of Fig. 1, of said apparatus. Fig. 3 is a horizontal sectional view taken in a line, $x\ x$, of Fig. 2; and Figs. 4 and 5 are detail views on a somewhat larger scale, illustrating the action of the folding mechanism upon the flanged edges of the metal in the formation of the seam.

In the drawings the invention is illustrated as applied in the manufacture of sheet-metal cans in which circular heads are fitted and seamed to cylindrical bodies. The bodies A are primarily formed at their ends with radial circumferential flanges $a$, as shown at the lower part of the body A, as represented in Fig. 1. The ends B are stamped or otherwise suitably brought to the shape also indicated at the lower end of the body A, as represented in said Fig. 1—that is to say, with the cup-shaped flange $c'$ so that the central or concave portion of the end B fits within the adjacent end of the body A, with the flange $c$ curving around the flange $a$ of the body. The body A and ends B are brought to the shape just indicated by any of the means well known in the trade for forming seam-flanges in sheet metal, and which require no specific description here. The body A, being provided with the ends B, is placed within a chuck composed of two axially-rotating jaws, C and D, one of which, C, is provided upon the inner end of a shaft, E, arranged in bearings $b$, so as to be capable of rotation, but sustained against any longitudinal movement by suitable shoulders provided on the shaft adjacent to the bearings $b$ aforesaid. The lower jaw, D, is attached to the upper end of a shaft, F, which is axially coincident with the shaft E, and which rotates in suitable fixed bearings, $c$, which, like the bearings $b$, are attached to the supporting-frame of the apparatus; but the shaft F, instead of being held against longitudinal movement, is so arranged within its bearings as to be capable of such movement, and, as represented in the drawings, descends, together with the jaw D, by its own gravity, and must be designedly moved and sustained in an upward direction. This latter is provided for by means of a lever, G, which, pivoted at one end, as shown at $f$ in Fig. 2, is provided at its other extremity with a step, $g$, into which fits the lower end of the shaft F; and vertical movement is given to this lever G by means of a treadle-lever, H, connected with the aforesaid lever G by a suitable link, $h$, so that by pressing downward upon the outer or treadle end of the treadle-lever H the step $g$ is moved upward, and consequently moves upward the shaft F and jaw D against the lowermost of the ends B, fitted into the adjacent end of the body A, the uppermost of the ends B being in like manner brought against the jaw C.

It will be noticed that the jaws C and D, fitted within the cavities formed in the outermost surfaces of the ends B, (the heads of the body A being securely griped between the said two jaws C and D,) are permitted to have a rotatory movement around the axis of the shafts E and F, and are at the same time held against any vertical movement, a rotatory movement being thus given to the shaft E by means of a suitable belt on a pulley, $i$. The shafts E and F, the jaws C and D, the body A, and the ends B all rotate in unison around the axis of the shafts aforesaid.

As represented in the drawings, the mechanisms for folding the flanges $a\ c$ together are represented only as applied at one end of the can formed by the body A and ends B; but it is to be understood that the same apparatus, which in the drawings is represented at one end only of the can, may, when desired, be applied at both, so that both ends of the can—or, in other words, the double seams at the two ends—may be formed without removing the body and ends from the chuck; but, inasmuch as this duplication (of the parts hereinafter presently described for folding the flanges together and forming the double seam) requires only ordinary mechanical judgment, I have not considered it necessary to illustrate the parts in duplicate, and more especially as the construction of the said parts and their arrangement in the formation of the seam is clearly indicated in the drawings, and their application to operate at both ends of the can instead of one is easily within the knowledge of any mechanic ordinarily skilled in the trade.

Supported upon a suitably-fixed bracket, I, or other appropriate support is a horizontal lever, J, which has its inner end extended laterally, or, if preferred, forked, in order to provide suitable bearings for two folding-rolls, K and L. The lever J is so arranged that the rolls K and L will be in substantially the same plane as the flanges $a$ and $c'$ to be joined, as indicated in Figs. 1 and 2 and on a larger scale in Figs. 4 and 5. Each of the rolls K and L should be formed with a flange, $m$, in order that the said flange, in the operation herein presently explained, may travel across and above the corresponding upper edge of the adjacent ends B, the object of this being merely to facilitate the retention of the rolls in position during their actual contact with the metal in the formation of the joint, and also to prevent the metal while being folded from creeping vertically out of the desired position. The essential feature of the rolls K and L is this, that each is circumferentially grooved; but the groove in one differs from that of the other. Thus, for example, the groove of the roll K shown at $n$ in Fig. 4 is semicircular in its cross-section, so that when brought in contact with the flanges $a$ and $c'$ it will operate to fold them one within the other to form the partial joint C to substantially a circular cross-section, as is represented in the said Fig. 4, whereas the groove of the roll L, shown at $r$, Fig. 5, is of such form as to flatten the circular and partially-formed joint just hereinbefore specified, and bring the same into a flattened, compact, and (so to speak) solid condition, as represented in Fig. 5.

The lever J and the rolls K and L carried thereon are placed in such proximity to and relation with the jaw C (and with the jaw D when both ends of the can are to be double-seamed without removing the same from the chuck) that by moving the lever J around its pivot S the roll K, moving in the direction indicated by the arrow in Fig. 3, may be brought against the flange $c'$ while the parts are being rapidly rotated, as hereinbefore explained. While the roll K is thus sweeping in the direction indicated by the arrow in contact with the flange $c'$ it causes the said flange $c'$, and also the flange $a$ within it, to be brought over into a semicircular or circular form by the pressing action exerted upon the metal by the grooved periphery of the said roll K, the result being that the two flanges are folded inward, one within the other, into the half-formed joint of semicircular or circular cross-section indicated in Fig. 4. No sooner has the roll K passed out of contact (by diverging in its circular path from that of the circumference of the end B) than the other roll, L, is in a similar manner brought in contact with the half-formed joint just described by the continued movement of the lever J, the result of this being that the grooved periphery of the said roll L acts upon the half-formed semicircular or circular joint above described and presses the same to the close, flattened contour and relatively solid condition represented in Fig. 5, so that by the operation, first, of the roll K, and, second, of the roll L (being but two operations following in rapid succession) the two flanges are united in a solid, compact, and strong joint, both of the said operations being performed during the rotation of the can by a single movement of the lever J; and inasmuch as the action of these two rolls K and L is so exerted as to compress the metal upon itself, and to turn it gradually with the slightest possible acuteness in the folding, it follows that no material breaking strain is exerted upon the flanges while they are being bent and infolded to form the double seam.

Inasmuch as the object of the lever J is to bring the rolls K and L, one after the other, in suitable relation with the flanges of the sheet-metal parts to be united, it follows that any device—for example, a slide—which will give the same movement to the said rolls with reference to the said flanges of the parts to be united will be merely the equivalent of the said lever.

I am aware that double seams or joints have been made of sheet metal by first folding one of the edges of the parts to be joined over and around the other of the said edges and then bringing the two against the sides of the article into which the sheet metal is formed; but in all such cases the bending of the metal has been with comparatively sharp bends, and the metal when thus folded has not been brought to a circular or semicircular form preliminary to the completion of the seam or joint. Such flat folding of one of the edges to be joined over or around the other I therefore do not claim; but

What I claim as my invention is—

1. In an apparatus for double-seaming articles of sheet metal, a chuck for carrying the parts to be united, in combination with the roll K, having a semicircular groove in its periphery, and a roll, L, having a flat-bottomed groove in its periphery, the said rolls placed upon a movable device, substantially as shown, for bringing the said rolls in succession upon the flanges of the parts pressed or held between the jaws of the chuck, the whole being arranged in relation with each other to first form an interlocked seam of semicircular cross-section, and to subsequently flatten the said seam or joint, substantially as and for the purpose herein set forth.

2. The combination of the following elements, to wit: a chuck constructed to clasp together the parts to be united, a treadle and adjustable step for actuating the said chuck to gripe and release the said parts, a roll for folding the flanges of the parts to be united into a joint or seam of a circular or semicircular cross-section, a roll for compressing the said joint into a flat and tight condition, and a lever or equivalent device for causing the rolls aforesaid to operate one after the other upon the flanges of the parts to be united, the whole constructed, combined, and arranged for joint use and operation substantially as and for the purpose herein set forth.

ALTON H. FANCHER.

Witnesses:
JAS. H. MATTHAEI,
THOMAS E. CROSSMAN.